United States Patent [19]

Stauffer

[11] Patent Number: 5,513,516
[45] Date of Patent: May 7, 1996

[54] METHOD AND APPARATUS FOR LEAK TESTING A CONTAINER

[75] Inventor: Anton Stauffer, Bedford, N.Y.

[73] Assignee: Visi-Pack, Inc., Tuckahoe, N.Y.

[21] Appl. No.: 877,196

[22] Filed: May 1, 1992

[51] Int. Cl.[6] ........................... G01M 3/02
[52] U.S. Cl. ............ 73/49.200; 73/52; 73/49.300
[58] Field of Search ................. 73/49.3, 49.2, 73/52, 45.4, 40.7

[56] References Cited

U.S. PATENT DOCUMENTS

| | | | |
|---|---|---|---|
| 2,093,429 | 9/1937 | Foss . | |
| 3,371,781 | 3/1968 | Armbruster et al. . | |
| 3,813,923 | 6/1974 | Pendleton | 73/49.2 |
| 3,998,091 | 12/1976 | Paquette et al. | 72/49.3 X |
| 4,055,984 | 11/1977 | Marx | 73/40.7 |
| 4,360,108 | 11/1982 | Logothetis | 73/52 X |
| 4,593,554 | 6/1986 | Aarts | 73/49.3 |
| 4,697,452 | 10/1987 | Prakken | 73/49.3 |
| 4,747,299 | 5/1988 | Fox et al. | 73/49.3 |
| 4,774,830 | 10/1988 | Hulsman | 73/49.3 |
| 4,899,574 | 2/1990 | Potteiger | 73/49.3 X |
| 4,901,558 | 2/1990 | Leining et al. | 73/49.3 |
| 4,922,746 | 5/1990 | Hulsman et al. | 73/49.3 |
| 4,930,345 | 6/1990 | Bausch | 73/49.3 X |
| 4,934,180 | 6/1990 | Hulsman | 73/49.3 |
| 5,029,464 | 7/1991 | Lehmann | 73/49.3 |
| 5,042,291 | 8/1991 | Lehmann | 73/49.3 |

FOREIGN PATENT DOCUMENTS

| | | | |
|---|---|---|---|
| 11470 | 4/1972 | Japan | 73/49.3 |
| 112027 | 5/1987 | Japan | 73/49.2 |

OTHER PUBLICATIONS

Food Packaging, Testing flexible containers for Leaks, reprinted from Food Engineering.
Journal of Packaging Technology. vol. 2, No. 4, Aug. 1988.
Technical Publications, Inc., Non–Destructive In–Line Detection Of Leaks In Food And Beverage Packages—An Analysis of Methods.
Brochure for In–Line Leaktester, Wilcomat K, Wilco Precision Testers.
Brochure for Leaktester, Wilcomat, Wilco Precision Testers.

*Primary Examiner*—Hezron E. Williams
*Assistant Examiner*—Daniel S. Larkin
*Attorney, Agent, or Firm*—Antonelli, Terry, Stout & Kraus

[57] ABSTRACT

A method and apparatus for leak testing a container wherein the container such as a flexible or semi-flexible package is received in a closeable test cavity. A pressure differential is installed between the inside of the container and an enclosed space within the test cavity outside of the container. A change in the pressure in the enclosed space is detected. The closeable test cavity comprises a flexible wall whose shape adapts to the shape of the container at least when the pressure differential is installed. The flexible wall advantageously compensates for variations in head space and shape of the packages, as where the contents are not uniformally distributed within the package. The flexible wall can sealingly contact a portion of the container spaced from a container seal to permit detection of seal leaks. A gas permeable, flexible screen can be employed between the container and the flexible wall to permit leak detection of leaks in the container beneath the flexible wall.

19 Claims, 3 Drawing Sheets

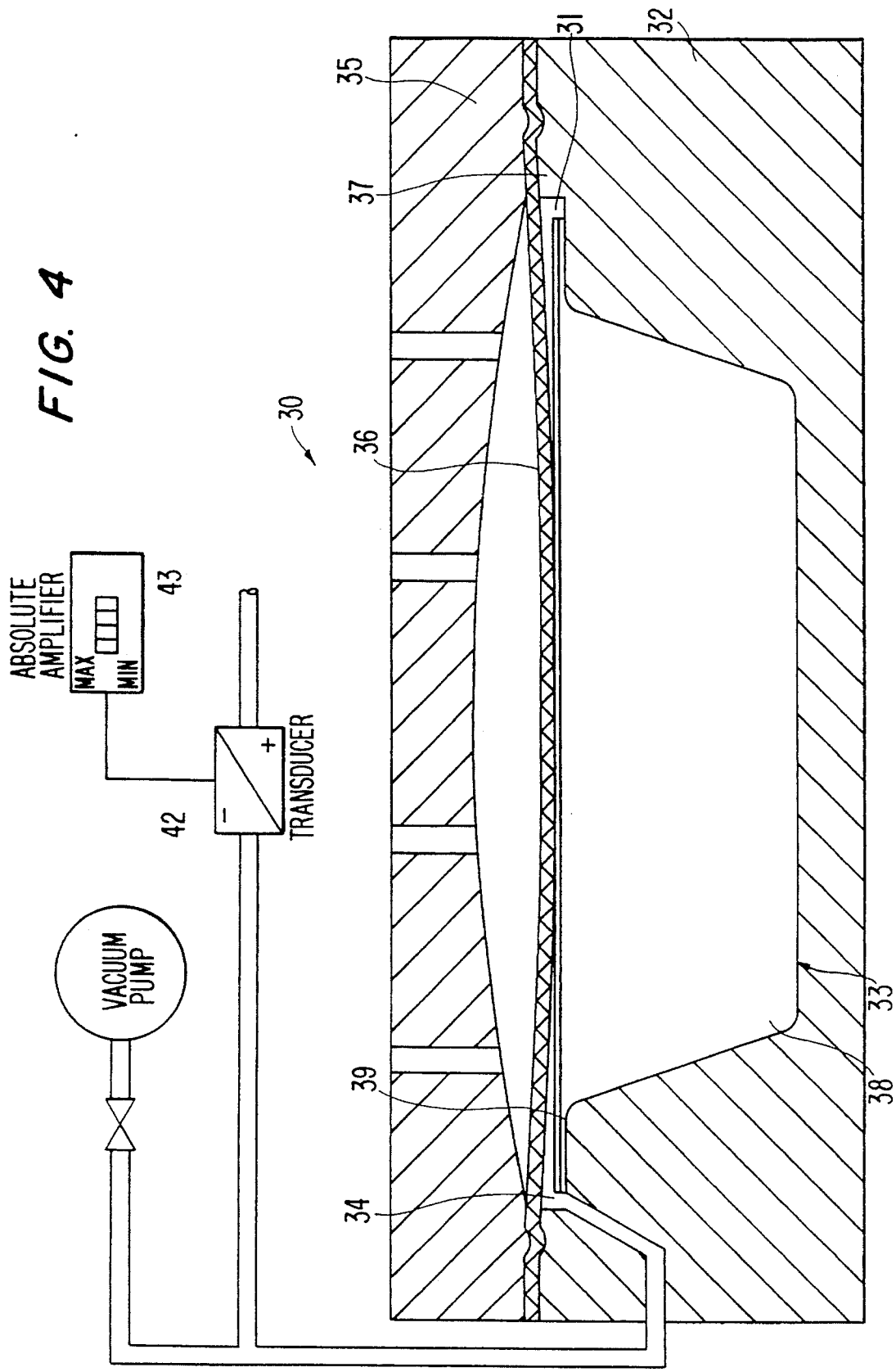

METHOD AND APPARATUS FOR LEAK TESTING A CONTAINER

TECHNICAL FIELD

The present invention relates to a method and apparatus for leak testing containers, particularly flexible or semi-flexible packages.

BACKGROUND ART

Many containers such as pouches and trays vary in the amount of headspace in the container. For example, flexible pouches containing cheese are initially filled with carbon dioxide and nitrogen gas along with the cheese. The gas is absorbed after several hours and the pouch is relatively flat but prior to this and after filling, gassing and initially sealing the pouch a substantial headspace is present due to the unabsorbed gas. The variation in headspace in the pouches influences the leak testing resulting when these containers are enclosed and leak tested in a fixed chamber testing apparatus as in U.S. Pat. No. 5,042,291, for example. There is a need for an improved method and apparatus for testing containers which avoid this disadvantage and which give more consistent test results when testing flexible or semi-flexible packages.

Tyvek packages are used primarily in the pharmaceutical and medical industry to enclose syringes, sponges, and other sterile products that are used by the medical profession in hospitals or surgery rooms. On one side of the package there is usually an impermeable plastic or tray and on the other side is the Tyvek cover or lid, which is a permeable paper so that the contents of the package can be sterilized after the package is sealed. If the seal of the package is not perfect, it could then let go or there could be a seal leak causing loss of sterility. When testing this type of package in the prior art apparatus and according to the prior art method, variable leaks are always measured so the test results are not reliable or consistent, because the Tyvek leak rate or permeability varies from one lot of material to another. There is a need for an improved method and apparatus for leak testing the seals in containers of this type.

DISCLOSURE OF INVENTION

An object of the present invention is to provide an improved method and apparatus for leak testing a container, especially a flexible or semi-flexible package, which overcome the aforementioned disadvantages of conventional leak testing methods and apparatus. More specifically, an object of the present invention is to provide an improved method and apparatus for leak testing containers which compensate for variations in headspace within the containers and which make it easier to obtain more consistent, reliable test results.

A further object of the invention is to provide an improved method and apparatus for leak testing containers of the type having a gas permeable side wall on one side thereof, as in a Tyvek-type container, such that variations in the leak rate or permeability of the gas permeable portion of the package do not render leak detection results for seal leaks meaningless or unreliable.

These and other objects are attained by the method of the invention for leak testing a container, the method comprising introducing a container to be tested into a test cavity having a flexible wall whose shape can be adapted to the shape of the container in the test cavity and, installing a pressure differential between the inside of the container and an enclosed space within the test cavity outside of the container. In the preferred embodiment of the invention, the pressure differential is established by introducing a measured vacuum in said enclosed space. The flexible wall adapts to the shape of the container at least when the vacuum is established in the enclosed space. A change in the pressure in the enclosed space is detected to provide an indication of whether or not the container leaks.

The flexible wall of the test cavity advantageously compensates for a variation in headspace in flexible and semi-flexible packages and makes it easier to test the packages. The flexible wall adapts to different shapes, as where the food or other contents is located in one part of the package thereby necessitating a certain adjustment. Illustratively, the flexible or semi-flexible package is a flexible pouch or a flanged tray or cup with a flexible lid sealed to a flange thereof. According to one embodiment of the disclosed method, the flexible wall not only adapts to the shape of a side of the container, but also sealingly contacts the flexible side of the container. This prevents pinhole detection in the area of the package sealingly covered by the flexible wall. This feature of the invention is taken advantage of in testing Tyvek packages as discussed further below.

Further, in order to test for leaks at an adjacent container seal, the flexible wall may be held in spaced relation to the container seal to facilitate the detection of leaks in the seal. If pinhole detection in the package on the side of the flexible wall of the apparatus is required, according to a variation of the method of the invention, a flexible, gas-permeable screen is placed on that side of the container between the flexible wall and the container to allow air to circulate and leaks in that side of the container to be detected.

A Tyvek package can be leak tested according to the method of the invention through the use of the flexible wall of the test cavity by allowing the flexible wall to sealingly contact the gas permeable material of the package at a location spaced from the container seal to facilitate the detection of only container seal leaks while eliminating the inconsistency in test results due to Tyvek leak rate or permeability variations from one container to another. The step of detecting a change in pressure in the enclosed space preferable comprises measuring the absolute pressure in the enclosed space and/or measuring a change in pressure over time in the enclosed space.

An apparatus for leak testing a container according to the invention comprises means defining a closable test cavity for receiving a container to be tested, means for installing a pressure differential between the inside of the container and an enclosed space within the test cavity outside of the container once the container is received therein, means for detecting a change in the pressure in the enclosed space, and wherein the means defining a closable test cavity comprises a flexible wall whose shape adapts to the shape of the container at least when the pressure differential is installed. The means for installing a pressure differential in the disclosed, preferred embodiments of the invention comprises means for establishing a measured vacuum in the enclosed space. Atmospheric pressure is communicated with the side of the flexible wall opposite the container through passages in the apparatus so that the flexible wall will automatically adapt to the shape of the container when the vacuum is established in the enclosed space of the test cavity.

In one embodiment of the invention the means for detecting a change in the pressure in the enclosed space includes means for measuring absolute pressure in the enclosed space. In another form of the invention, the means for detecting a change in the pressure in the enclosed space includes means for measuring a change in pressure over time in the enclosed space.

The means defining a closable test cavity in the disclosed embodiments comprises first and second opposed members which are configured to define the test cavity therebetween. At least one of the members is movable is relative to the other for opening and closing the test cavity. A flexible layer of rubber extends between the first and second members to form a flexible side wall of the test and cavity test is adaptable to the shape of the container to be tested.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 4 is a schematic illustration, partially in cross-section of an apparatus for leak testing a container such as a Tyvek package with a gas permeable, flexible lid sealed to a cup or tray of gas impermeable material.

BEST MODE FOR CARRYING OUT THE INVENTION

Figure 1:
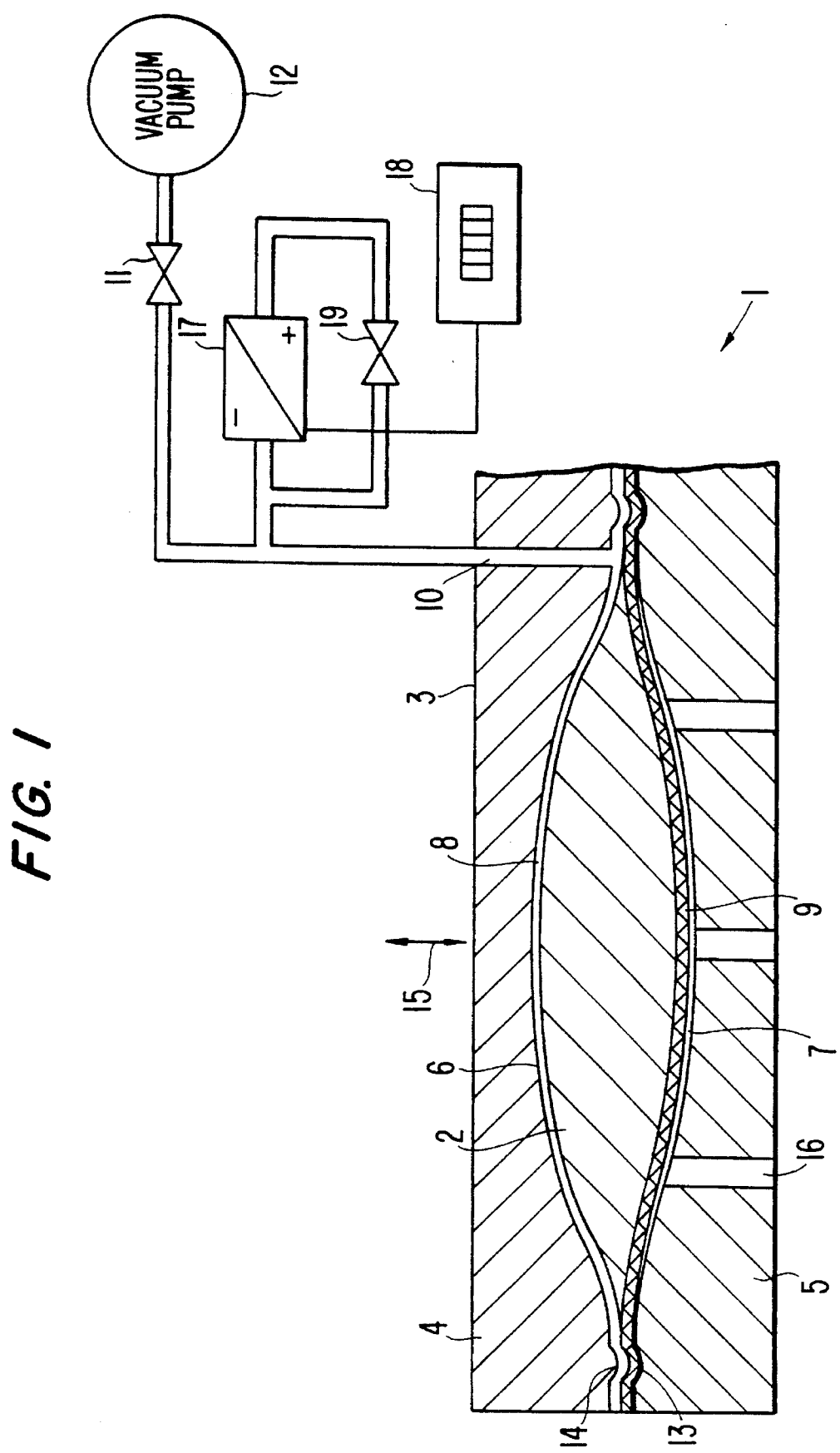
FIG. 1 is a schematic illustration, partially in cross-section, of an apparatus for leak testing a flexible pouch according to a first embodiment of the invention.

Referring now to FIG. 1 of the drawings, an apparatus 1 according to a first embodiment of the invention is for leak testing a flexible container 2 in the form of a pouch made of flexible material sealed together at a flange 3 along one or more edges of the pouch. Opposed, upper and lower members 4 and 5 of the apparatus are each dished or hollowed out on their opposing faces, 6 and 7, respectively, for defining a test cavity 8 for receiving the container 2 to be tested.

The apparatus 1 further includes a flexible wall 9 which extends over the surface of lower member 5 as one side wall of the test cavity 8. The flexible wall 9 adapts to the shape of and sealingly contacts the lower surface of container 2 in the test cavity 8 when a measured vacuum is introduced into the test cavity 8 about the container 2 by way of passage 10, valve 11 and vacuum pump 12. Instead of one flexible side wall, the apparatus could have a flexible wall on both lower member 5 and upper member 4. In such case, both of the flexible walls would adapt to the shape of and sealingly contact respective surfaces of the container 2. The flexible wall over the upper member 4 could have an aperture therethrough for passage 10 as in the embodiment of FIG. 2.

The flexible wall 9 extends outwardly beyond the test cavity 8 between the upper and lower members 4 and 5. A cooperating recess 13 on lower member 5 and projection 14 on upper member 4 compress the flexible wall 9 to sealing close the test cavity 8 when the upper member 4 is moved toward the lower member 5 along the direction indicated by arrow 15 in FIG. 1. Passages 16 through the lower member 5 communicate the lower surface of the flexible wall 9 with atmospheric pressure so that the flexible wall will be pressed against the lower surface of the container 2 when a vacuum is established in the test cavity. The sealing contact of the flexible wall 9 against the lower surface of the pouch 9 may lower the leak sensitivity for detecting leaks in the lower surface of the pouch. However, the sealed flange 3 of the pouch is exposed to the reduced pressure in the enclosed space within test cavity 8 at its end and upper surface to permit detection of leaks in the seal. Most leaks occur in the seal or immediately adjacent the seal in this type of container so the testing can produce useful, reliable results, even with variation in the shape of the package and variations in headspace.

A method for leak testing a sealed package with the apparatus 1 of FIG. 1 involves inserting a sealed pouch 2 to be tested into the open test cavity 8 with the upper and lower members in spaced relation. Thereafter, the members 4 and 5 are moved relative to one another to compress the flexible wall 9 for sealingly closing the test cavity 8. A measured vacuum is established in the enclosed space within the test cavity about the pouch 2 by way of passage 10, valve 11 and vacuum pump 12. After a period of stabilization, the pressure in the enclosed space within the test cavity is measured by means of a pressure transducer and amplifier. If the measured vacuum decreases (pressure increases) more than a normal amount, then the container is determined to be a leaker and is rejected. That is, an underpressure is established in the enclosed space into which the higher pressure container loses pressure in the case of a leak. With the apparatus 1 of FIG. 1, the pressure is measured dynamically by detecting the change in pressure in the enclosed space over time. For this purpose, the transducer in the apparatus of FIG. 1 is a differential transducer 17 whose output is received by amplifier 18.

If the change in pressure in the enclosed space over a predetermined time period exceeds a predetermined amount, for example 10 mb, the pack in container is deemed to have a leak and is rejected. This method is more sensitive than that described with reference to FIG. 4 wherein a pressure transducer 42 and an absolute pressure indicating amplifier 43 are employed, but either or both methods and related apparatus can be employed with each of the several embodiments of the apparatus of the invention.

For operation of the apparatus 1 to perform a leak test on sealed package 2, the measured vacuum is initially established through the operation of valve 11 and vacuum pump 12 as noted above. After a period of stabilization, the valve 19 is closed to begin a predetermined timing cycle for measuring a change in pressure in the enclosed space within test cavity 8 about the container 2. If the change in pressure in the enclosed space as measured by amplifier 18 during this predetermined time exceeds a predetermined amount, the package is deemed to have a leak and is rejected as previously stated.

Figure 2:
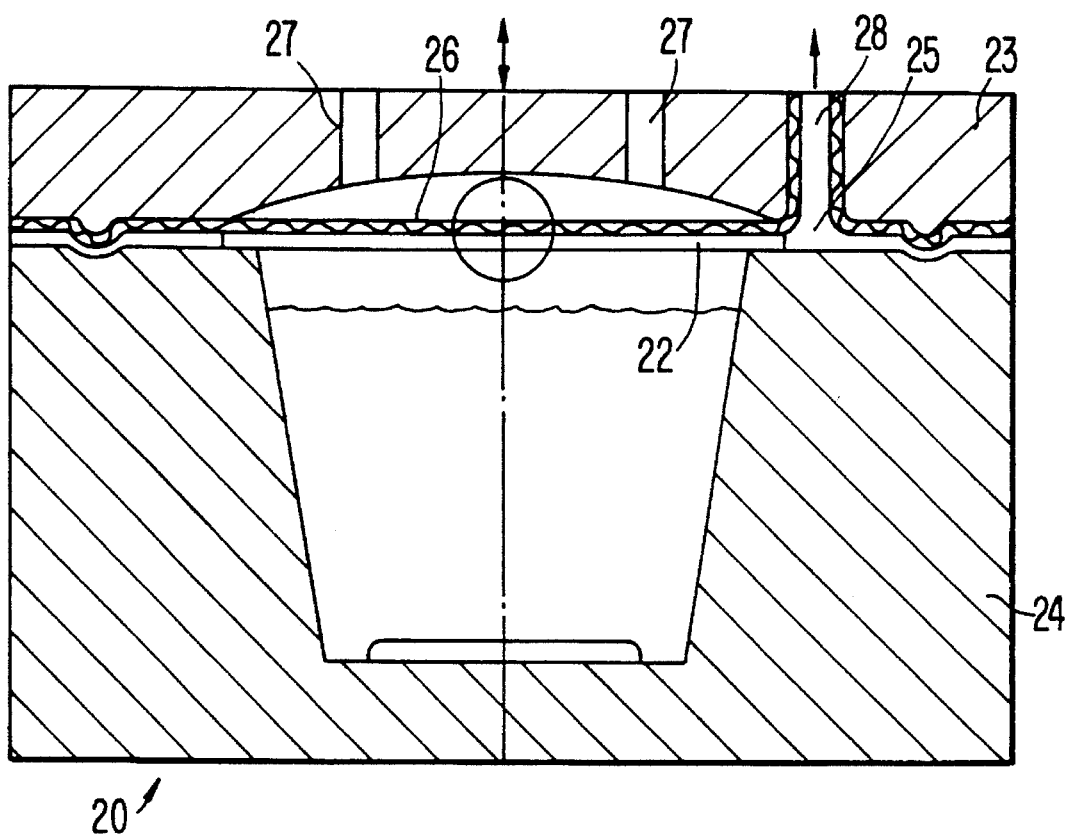
FIG. 2 is a schematic illustration, in cross-section, of a portion of an apparatus according to a second embodiment of the invention for leak testing a cup or tray having a flexible lid sealed thereto.

The apparatus 20 in FIG. 2 is for testing a cup or tray 21 having a flexible lid 22 sealed about the flange of the cup or tray. The apparatus comprises upper and lower members 23 and 24, respectively. The members 23 and 24 are configured on their opposing faces so as to define a test cavity 25 for receiving the cup 21 to be tested. A flexible wall 26 extends over the cup 21 in the test cavity between the members 23 and 24 as depicted in FIG. 2. The wall 26, as well as the flexible wall 9 of apparatus 1, may be formed of a sheet of rubber, for example.

Figure 3:
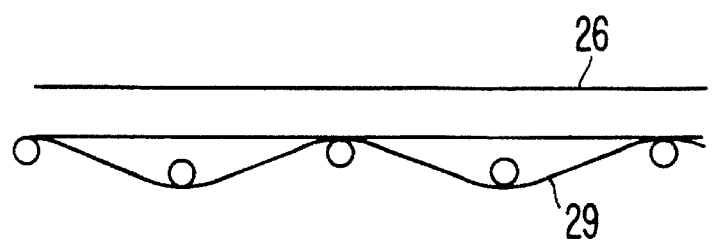
FIG. 3 is an enlarged view of circled portion 3 of the apparatus of FIG. 2 showing the flexible rubber wall and a gas permeable, flexible screen between the flexible wall and the lid of the cup or tray to permit detection of leaks in the container wall immediately beneath the flexible rubber wall of the apparatus.

The upper side of the flexible wall 26 is communicated with the atmosphere by passages 27 in member 23. A vacuum is introduced, through a passage 28 in the upper member 23 and in flexible wall 26, to the enclosed space within the test cavity 25 about the cup 21. Introduction of a measured vacuum in the enclosed space in test cavity 25 causes the flexible wall 26 to adapt to the shape of the flexible lid 22 of the cup or tray 21. To permit testing for leaks across the entire surface of the flexible lid 22, a flexible screen 29 is positioned between the flexible wall 26 of the apparatus and the flexible lid 22 of the container. The screen 29 has an oven weave construction, of plastic for example, so that it is gas permeable, allowing gas flow through and along the screen. This enables detection of leaks in the container wall adjacent the flexible wall 26. Testing is performed in the same manner as described above with respect to the apparatus of FIG. 1, or in the manner described with respect to FIG. 4 below. If desired, the flexible, gas permeable screen 29 shown in FIG. 3 can be employed in testing of the apparatus of FIG. 1.

The apparatus 30 in FIG. 4 comprises an annular recess 31 in the upper surface of the lower member 32 for supporting the sealed flange of the container 33 in a test cavity 34 located between the lower member 32 and upper member 35. A flexible wall 36 of rubber extends between the upper and lower members above the container 33 to be leak tested. In order to leak test only the sealed flange of the container 33 and the area immediately adjacent thereto, the lower member 32 has an annular projecting portion 37 which extends about the recess 31 and above the top of the sealed flange of container 33 supported in the recess 31.

The projecting portion 37 locally elevates the flexible wall 36 to a position above the sealed flange and the area immediately adjacent thereto during testing. However, as illustrated in FIG. 4, the rubber sheet of the flexible wall 36 is allowed to sealingly contact the portion of the flexible lid of the container 33 inwardly of the sealed flange of the container. This arrangement is particularly effective for leak testing Tyvek packages according to the method of the invention. As referred to heretofore, Tyvek packages are used primarily in the pharmaceutical and medical industry to enclose syringes, sponges and other sterile products that are used by the medical profession in hospitals or surgery rooms. The Tyvek package 33 in FIG. 4 includes a lower, gas impermeable plastic tray or cup 38 and a top of Tyvek brand material, that is a gas permeable paper layer 39 through which the contents of the package can be sterilized after the permeable paper of layer 39 is sealed at its outer edge to the flange of the plastic tray 38. If this seal is not perfect, there can be a loss of sterility. To prevent this from happening, it is preferred that the container be leak tested after sterilization.

In the past, leak testing of such containers in a fixed chamber has always resulted in measurement of variable leaks because the Tyvek material leak rate or permeability varies from one lot of material to another. Therefore, the standard leak detection becomes meaningless. To solve this problem, according to the invention the flexible rubber extends over most of the gas permeable paper layer 39 of the package in sealing contact with the permeable material to essentially cover up the permeable layer as soon as the vacuum is introduced into the enclosed space of the test cavity 34 about the container 33. Testing then occurs only locally for pinholes across the seal.

One limitation of this method and apparatus is that if the sealingly covered Tyvek layer has pinholes, they would not be detected by this method. However, this is improbable and normally presents an acceptable risk. But, if necessary, a preliminary test of the Tyvek material itself, before sealing to the flange of the tray 38, can be performed to further reduce the risk of pinholes in the Tyvek material apart from the sealed flange. The method and apparatus of FIG. 4 also have applicability to sealed containers having a flexible lid formed of a material which is not gas permeable.

From the above discussion of the several embodiments of the apparatus of the invention, it is seen that the method of the invention for leak testing a container comprises introducing a container to be tested into a test cavity having a flexible wall whose shape can be adapted to the shape of the container in the test cavity. A pressure differential is installed between the inside of the container and an enclosed space within the test cavity outside of the container by establishing a measured vacuum in the enclosed space. The flexible wall adapts to the shape of the container at least when the vacuum is established in the enclosed space. A change in the pressure in the enclosed space is detected with differential and/or absolute pressure transducers to determine whether the container has a leak. The container being tested is preferably a flexible or semi-flexible container such as a flexible pouch or a flanged tray or cup with a flexible lid as discussed above. As a result of the adaptation of the flexible wall of the apparatus to the pouch or package with the application of the vacuum in the enclosed space within the test cavity, variations in head space in such packages can be compensated for to advantageously reduce the influence of this variable on the leak testing results.

While I have shown and described only several embodiments in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. An apparatus for leak testing a flexible or semi-flexible container having a headspace as well as a product therein, said apparatus comprising:

means defining a closable test cavity for receiving a flexible or semi-flexible container having a headspace as well as a product therein;

means for installing a pressure differential between the inside of said container and an enclosed space within said test cavity outside of said container, once said container is received therein, by installing a measured vacuum in said enclosed space at a pressure lower than a pressure in said container;

means for detecting a change in the pressure in the enclosed space;

wherein said means defining a closeable test cavity comprises a flexible wall whose shape adapts to the shape of said container at least when said pressure differential is installed, and wherein said flexible wall, when adapted to the shape of the container, sealingly contacts a portion of said container in the test cavity whereby the container can be tested only for leaks outside said portion of the container contacted by said flexible wall.

2. An apparatus according to claim 1, wherein said flexible wall is arranged so as to automatically adapt to the shape of the container when said vacuum is established.

3. An apparatus according to claim 1, wherein said means for detecting a change in the pressure in the enclosed space includes means for measuring absolute pressure in the enclosed space.

4. An apparatus according to claim 1, wherein said means for detecting a change in the pressure in the enclosed space includes means for measuring a change in pressure over time in the enclosed space.

5. An apparatus according to claim 1, wherein said flexible wall defines one side wall of the test cavity.

6. An apparatus according to claim 5 wherein a side wall of the test cavity opposite said flexible wall has a fixed shape.

7. An apparatus for leak testing a flexible or semi-flexible container having a headspace as well as a product therein, said apparatus comprising:

means defining a closable test cavity for receiving a flexible or semi-flexible container having a headspace as well as a product therein;

means for installing a pressure differential between the inside of said container and an enclosed space within said test cavity outside of said container, once said container is received therein, by installing a measured vacuum in said enclosed space at a pressure lower than a pressure in said container;

means for detecting a change in the pressure in the enclosed space;

wherein said means defining a closeable test cavity comprises a flexible wall whose shape adapts to the shape of the container at least when said pressure differential is installed and said apparatus further comprising a flexible, gas permeable screen located between said flexible wall and said container so that leaks in said container on the side of said flexible wall can be detected when the shape of the flexible wall is adapted to the shape of the container.

8. An apparatus for leak testing a container comprising:

means defining a closable test cavity for receiving a container to be tested;

means for installing a pressure differential between the inside of said container and an enclosed space within said test cavity outside of said container, once said container is received therein;

means for detecting a change in the pressure in the enclosed space;

wherein said means defining a closeable test cavity comprises a flexible wall whose shape adapts to the shape of the container at least when said pressure differential is installed, and first and second opposed members which are configured to define said test cavity therebetween, at least one of said members being movable relative to the other for opening and closing said test cavity, wherein said flexible wall is formed by a flexible layer extending between said first and second members, wherein at least one aperture extends through one of said first and second members in communication with said test cavity for installing said pressure differential, and wherein said flexible layer extends outwardly from said container received in said test cavity and between said first and second members for sealing the test cavity when said flexible layer is pressed between the first and second members.

9. An apparatus according to claim 8, wherein said means for installing a pressure differential comprises means for establishing a measured vacuum in said enclosed space, and passage means extending through one of the first and second members to a side of the flexible layer opposite said test cavity for communicating atmospheric pressure to said side of the flexible layer so that the flexible layer will adapt to the shape of the container in said test cavity when said measured vacuum is installed in said enclosed space.

10. An apparatus according to claim 8, wherein said flexible layer is formed of rubber.

11. An apparatus according to claim 8, wherein said at least one aperture also extends through said flexible layer to said test cavity.

12. A method for leak testing a flexible or semi-flexible container having a headspace as well as a product therein, said method comprising introducing said container to be tested into a test cavity having a flexible wall whose shape can be adapted to the shape of the container in said test cavity, installing a pressure differential between the inside of the container and an enclosed space within the test cavity outside of the container by establishing a measured vacuum in said enclosed space at a pressure lower than a pressure within said container to be tested, said flexible wall adapting to the shape of the container at least when said vacuum is established in said enclosed space, and detecting a change in the pressure in the enclosed space, and wherein a gas permeable, flexible screen is provided between said container and said flexible wall to permit detection of leaks in the container which are covered by said flexible wall.

13. A method according to claim 12, wherein said container is a flexible pouch.

14. A method according to claim 12, wherein said container is a flanged tray or cup with a flexible lid sealed to the flange thereof, and wherein said flexible wall is adapted to the shape of the flexible lid of the tray or cup.

15. A method according to claim 12, wherein said step of detecting a change in pressure comprises measuring the absolute pressure in the enclosed space.

16. A method according to claim 12, wherein said step of detecting a change in pressure comprises measuring a change in pressure over time in the enclosed space.

17. A method for leak testing a flexible or semi-flexible container having a headspace as well as a product therein, said method comprising introducing said container to be tested into a test cavity having a flexible wall whose shape can be adapted to the shape of the container in said test cavity, installing a pressure differential between the inside of the container and an enclosed space within the test cavity outside of the container by establishing a measured vacuum in said enclosed space at a pressure lower than a pressure within said container to be tested, said flexible wall adapting to the shape of the container at least when said vacuum is established in said enclosed space, and detecting a change in the pressure in the enclosed space, and wherein said container has a sealed flange, said flexible wall being held in spaced relation from the sealed flange of the container but being adapted to the shape of and contacting the container inwardly of said flange at least when said vacuum is established.

18. A method for leak testing a flexible or semi-flexible container having a headspace as well as a product therein, said method comprising introducing said container to be tested into a test cavity having a flexible wall whose shape can be adapted to the shape of the container in said test cavity, installing a pressure differential between the inside of the container and an enclosed space within the test cavity outside of the container by establishing a measured vacuum in said enclosed space at a pressure lower than a pressure within said container to be tested, said flexible wall adapting to the shape of the container at least when said vacuum is established in said enclosed space, and detecting a change in the pressure in the enclosed space, and wherein said flexible wall sealingly contacts a portion of the container and adapts to the shape of said portion of the container at least when said vacuum is established whereby only container leaks outside said portion are detected.

19. A method according to claim 18, wherein one side of said container is formed of a gas permeable material on one side which is sealed to a gas impermeable material of the container at a container seal, said gas permeable material permitting sterilization of the contents of the container after it is sealed, and wherein said flexible wall adapts to the shape of and sealingly contacts the gas permeable material at a location spaced from said container seal to facilitate detection of container seal leaks.

* * * * *